(12) United States Patent
Miyazaki et al.

(10) Patent No.: US 12,306,478 B2
(45) Date of Patent: May 20, 2025

(54) OPTICAL MODULATOR AND OPTICAL TRANSMITTER

(71) Applicant: SUMITOMO OSAKA CEMENT CO., LTD., Tokyo (JP)

(72) Inventors: Norikazu Miyazaki, Tokyo (JP); Toru Sugamata, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 297 days.

(21) Appl. No.: 18/085,545

(22) Filed: Dec. 20, 2022

(65) Prior Publication Data

US 2023/0194904 A1 Jun. 22, 2023

(30) Foreign Application Priority Data

Dec. 22, 2021 (JP) ................. 2021-208306

(51) Int. Cl.
*G02F 1/01* (2006.01)
*G02F 1/225* (2006.01)

(52) U.S. Cl.
CPC ............ *G02F 1/0121* (2013.01); *G02F 1/011* (2013.01); *G02F 1/2255* (2013.01); *G02F 1/2257* (2013.01)

(58) Field of Classification Search
CPC ...... G02F 1/0121; G02F 1/011; G02F 1/2255; G02F 1/2257
See application file for complete search history.

(56) References Cited

U.S. PATENT DOCUMENTS

| | | | | |
|---|---|---|---|---|
| 11,320,595 B2 * | 5/2022 | Sugiyama | ............... | G02F 1/225 |
| 11,467,467 B2 * | 10/2022 | Ozaki | ..................... | G02F 1/025 |
| 2014/0241659 A1 | 8/2014 | Fukuda et al. | | |

FOREIGN PATENT DOCUMENTS

| | | |
|---|---|---|
| JP | 2014164243 | 9/2014 |
| JP | 6933287 | 9/2021 |

* cited by examiner

*Primary Examiner* — Sung H Pak
(74) *Attorney, Agent, or Firm* — JCIPRNET

(57) ABSTRACT

An optical modulator includes: an optical waveguide element including an optical waveguide formed on a substrate and a signal electrode for controlling a light wave propagating through the optical waveguide; a drive circuit for outputting two high-frequency signals; and two terminating resistors for respectively terminating outputs of the two high-frequency signals from the drive circuit. The output of one of the high-frequency signals of the drive circuit propagates through the signal electrode of the optical waveguide element and is terminated by a first terminating resistor which is one of the terminating resistors. The output of the other of the high-frequency signals of the drive circuit is terminated by a second terminating resistor which is the other of the terminating resistors. A resistance value of the second terminating resistor is greater than a resistance value of the first terminating resistor.

8 Claims, 6 Drawing Sheets

OPTICAL MODULATOR AND OPTICAL TRANSMITTER

CROSS-REFERENCE TO RELATED APPLICATION

This application claims the priority benefit of Japan application serial no. 2021-208306, filed on Dec. 22, 2021. The entirety of the above-mentioned patent application is hereby incorporated by reference herein and made a part of this specification.

BACKGROUND

Technical Field

The disclosure relates to an optical modulator and an optical transmitter.

Description of Related Art

In a high-speed/large-capacity optical fiber communication system, optical modulators incorporating an optical modulation element as an optical waveguide element configured by an optical waveguide formed on a substrate and a control electrode for controlling a light wave propagating through the optical waveguide are often used. Semiconductor optical modulation elements using a semiconductor substrate such as an InP substrate and LN optical modulation elements using $LiNbO_3$ (hereinafter also referred to as LN) as a substrate have been put to practical use as optical waveguide elements that perform optical modulation operations.

Patent Literature 1 discloses a semiconductor optical modulation module provided with a semiconductor optical modulation element including a Mach-Zehnder optical waveguide. In this semiconductor optical modulation module, a standardized small housing called high bandwidth coherent driver modulator (HB-CDM) is used, and an optical modulation operation is performed by inputting each of two high-frequency electrical signals (hereinafter referred to as high-frequency signals) that configure a pair of differential signals having mutually opposite phases to electrodes respectively formed on two parallel waveguides configuring the Mach-Zehnder optical waveguide. A drive circuit element (high frequency driver) that outputs a differential signal for driving such a semiconductor optical modulation element has already been put into practical use in the form of an integrated circuit and is commercially available.

In addition, LN optical modulation elements are widely used in high-speed/large-capacity optical fiber communication systems because they may achieve broadband optical modulation characteristics with less light loss than semiconductor optical modulation elements; however, dedicated drive circuit elements for driving the LN optical modulation elements used in the HB-CDM have not yet been commercialized due to low demand. Therefore, it would be convenient if a drive circuit element developed for a semiconductor optical modulation module and already put into practical use could be used even in an optical modulator including an LN optical modulation element.

However, in the case of an LN optical modulation element that uses an X-cut substrate as the LN substrate, as described in Patent Literature 2, no differential signal is required, and to drive each Mach-Zehnder optical waveguide configuring the LN optical modulation element, it is sufficient to input one high-frequency electric signal to one signal electrode formed between two parallel waveguides.

In such an optical modulation element that does not use a differential signal, when the drive circuit element that outputs the differential signal is used, it is necessary to connect the output terminal for one of the high-frequency signals configuring the differential signal to the signal electrode, and treat the output terminal for the other high-frequency signal by appropriate ways.

However, depending on how the other output terminal is treated, the operation of the drive circuit element may become unstable due to the reflection of the high-frequency signal that may occur in the circuit component connected to the output terminal, or the power consumption of the drive circuit element as a whole may become inefficient due to unnecessary signal power output from the output terminal and consumed.

RELATED ART

Patent Literature

[Patent Literature 1] Japanese Patent Application Laid-Open No. 2014-164243
[Patent Literature 2] Japanese Granted Patent Publication No. 6933287

SUMMARY

Technical Problem

In view of the above background, the disclosure avoids destabilization of operation in an optical modulator that drives an optical modulation element using a part of the signal output of a drive circuit that outputs multiple signals such as differential signals while reducing power consumption or reducing the size.

Solution to Problem

An embodiment of the disclosure provides an optical modulator including: an optical waveguide element including an optical waveguide formed on a substrate and a signal electrode for controlling a light wave propagating through the optical waveguide; a drive circuit for outputting two high-frequency signals; and two terminating resistors for respectively terminating outputs of the two high-frequency signals from the drive circuit. The output of one of the high-frequency signals of the drive circuit propagates through the signal electrode of the optical waveguide element and is terminated by a first terminating resistor which is one of the terminating resistors. The output of the other of the high-frequency signals of the drive circuit is terminated by a second terminating resistor which is the other of the terminating resistors. A resistance value of the second terminating resistor is greater than a resistance value of the first terminating resistor.

According to another embodiment of the disclosure, the two high-frequency signals output by the drive circuit are a pair of differential signals whose phases are opposite to each other.

According to another embodiment of the disclosure, a sum of the resistance value of the first terminating resistor and the resistance value of the second terminating resistor is equal to a differential impedance of the outputs of the two high-frequency signals that configure the differential signals of the drive circuit.

According to another embodiment of the disclosure, the resistance value R1 of the first terminating resistor that terminates the output of the one of the high-frequency signals driving the signal electrode is in a range of 0.4×Zlin<R1≤Zlin with respect to a value Zlin of an output impedance between the output of the one of the high-frequency signals and a ground potential in the drive circuit.

According to another embodiment of the disclosure, the value Zlin of the output impedance is 50Ω, and the resistance value R1 of the first terminating resistor is 45Ω or less.

According to another embodiment of the disclosure, the substrate of the optical waveguide element is an X-cut LiNbO$_3$ substrate.

According to another embodiment of the disclosure, an electrical length L1 of a high-frequency transmission line from the output of the drive circuit to the first terminating resistor for the one of the high-frequency signals is different from an electrical length L2 of a high-frequency transmission line from the output of the drive circuit to the second terminating resistor for the other of the high-frequency signals.

According to another embodiment of the disclosure, the electrical lengths L1 and L2 have a relationship of (L1−L2)>λ/2 with respect to an average wavelength λ of the two high-frequency signals in the high-frequency transmission line.

Another embodiment of the disclosure provides an optical transmitter including: the optical modulator according to any one of the above embodiments; and an electronic circuit that generates a modulation signal which is a high-frequency signal for causing the optical waveguide element to perform a modulation operation.

Effects

According to the disclosure, it is possible to avoid destabilization of operation in an optical modulator that drives an optical modulation element using a part of the signal output of a drive circuit that outputs multiple signals such as differential signals while reducing power consumption or reducing the size.

DESCRIPTION OF EMBODIMENTS

Hereinafter, embodiments of the disclosure will be described with reference to the drawings.

1. First Embodiment

Figure 1:
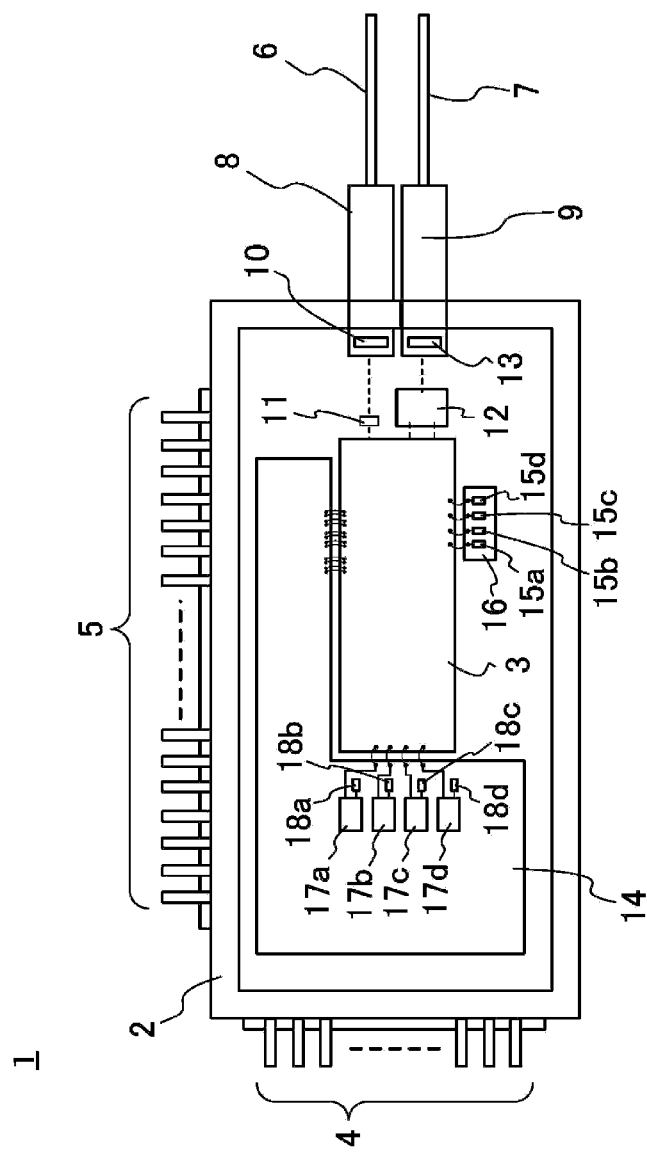
FIG. 1 is a diagram showing the configuration of an optical modulator according to the first embodiment of the disclosure.

First, a first embodiment of the disclosure will be described. FIG. 1 is a diagram showing the configuration of an optical modulator 1 using an optical modulation element, which is an optical waveguide element, according to the first embodiment of the disclosure.

The optical modulator 1 includes a housing 2 and an optical modulation element 3 housed in the housing 2. The optical modulation element 3 is, for example, a DP-QPSK modulator configuration. For example, the housing 2 complies with the industry standard HB-CDM standard-"Implementation Agreement for the High Bandwidth Coherent Driver Modulator (HB-CDM) OIF-HB-CDM-02.0" (Jul. 15, 2021, published by OIF). In addition, the housing 2 is finally hermetically sealed with a plate-shaped cover (not shown) fixed to the opening thereof.

The housing 2 includes a signal pin 4 for inputting a high-frequency electrical signal used for modulation of the optical modulation element 3 and a signal pin 5 for inputting an electrical signal used for adjusting the operating point of the optical modulation element 3. In the following description, the terms impedance and resistance refer respectively to the impedance and resistance at the frequency of the high-frequency electrical signal used for modulation of the optical modulation element.

The optical modulator 1 further includes an input optical fiber 6 for inputting light into the housing 2 and an output optical fiber 7 for guiding the light modulated by the optical modulation element 3 to the outside of the housing 2 on the same side of the housing 2.

The input optical fiber 6 and the output optical fiber 7 are fixed to the housing 2 via supports 8 and 9 which are fixing members, respectively. Light input from the input optical fiber 6 is collimated by a lens 10 disposed in the support 8 and then input to the optical modulation element 3 via a lens 11. However, this is only an example, and the input of light to the optical modulation element 3 may be performed according to conventional technology, for example, in which the input optical fiber 6 is introduced into the housing 2 via the support 8, and the end surface of the introduced input optical fiber 6 is connected to the end surface of a substrate 30 (described later) of the optical modulation element 3.

The optical modulator 1 further includes an optical unit 12 for polarization-synthesizing the two modulated lights output from the optical modulator 3. The light after polarization synthesis output from the optical unit 12 is condensed by the lens 13 disposed in the support 9 and coupled to the output optical fiber 7.

In the housing 2 of the optical modulator 1, a relay substrate 14 and a terminator 16 including four terminating resistors 15a, 15b, 15c, and 15d having a predetermined impedance are disposed. Hereinafter, the terminating resistors 15a, 15b, 15c, and 15d are also collectively referred to as the terminating resistors 15.

The relay substrate 14 is mounted with four drive circuit elements 17a, 17b, 17c, and 17d for respectively driving four signal electrodes 41 (described later) provided on the four Mach-Zehnder optical waveguides of the optical modulation element 3. Hereinafter, the drive circuit elements 17a, 17b, 17c, and 17d are also collectively referred to as the drive circuit elements 17. The drive circuit element 17 is mounted on the relay substrate 14 in the form of an integrated circuit, for example.

The drive circuit element 17 is a two-signal input two-signal output type amplifier circuit that amplifies differential signals, which are two high-frequency electrical signals (hereinafter referred to as high-frequency signals) whose phases are opposite to each other (that is, 180 degrees out of phase), and outputs the two amplified differential signals. Four (that is, four pairs of) differential signals respectively input to the four drive circuit elements 17 are provided from an external device via the signal pins 4, for example. The high-frequency signal that configures the differential signal is, for example, an electric signal in the microwave band, and is an electrical signal that includes a signal component with a frequency of, for example, the G band or higher specified in the IEEE standard, specifically 0.2 GHz or higher.

Four terminating resistors 18a, 18b, 18c, and 18d are further mounted on the relay substrate 14. Hereinafter, the terminating resistors 18a, 18b, 18c, and 18d are also collectively referred to as the terminating resistors 18.

One of the two high-frequency signals, which are differential signals output from the drive circuit element 17, is input to one signal electrode 41 of the optical modulation element 3, propagates through the signal electrode 41, and then terminated by one terminating resistor 15. Further, the other high-frequency signal of the two high-frequency signals which are differential signals output from the drive circuit element 17 is terminated by one terminating resistor 18 mounted on the relay substrate 14.

Electrical connection between the optical modulation element 3, the relay substrate 14 and the terminator 16 is performed by wire bonding or the like, for example.

Figure 2:
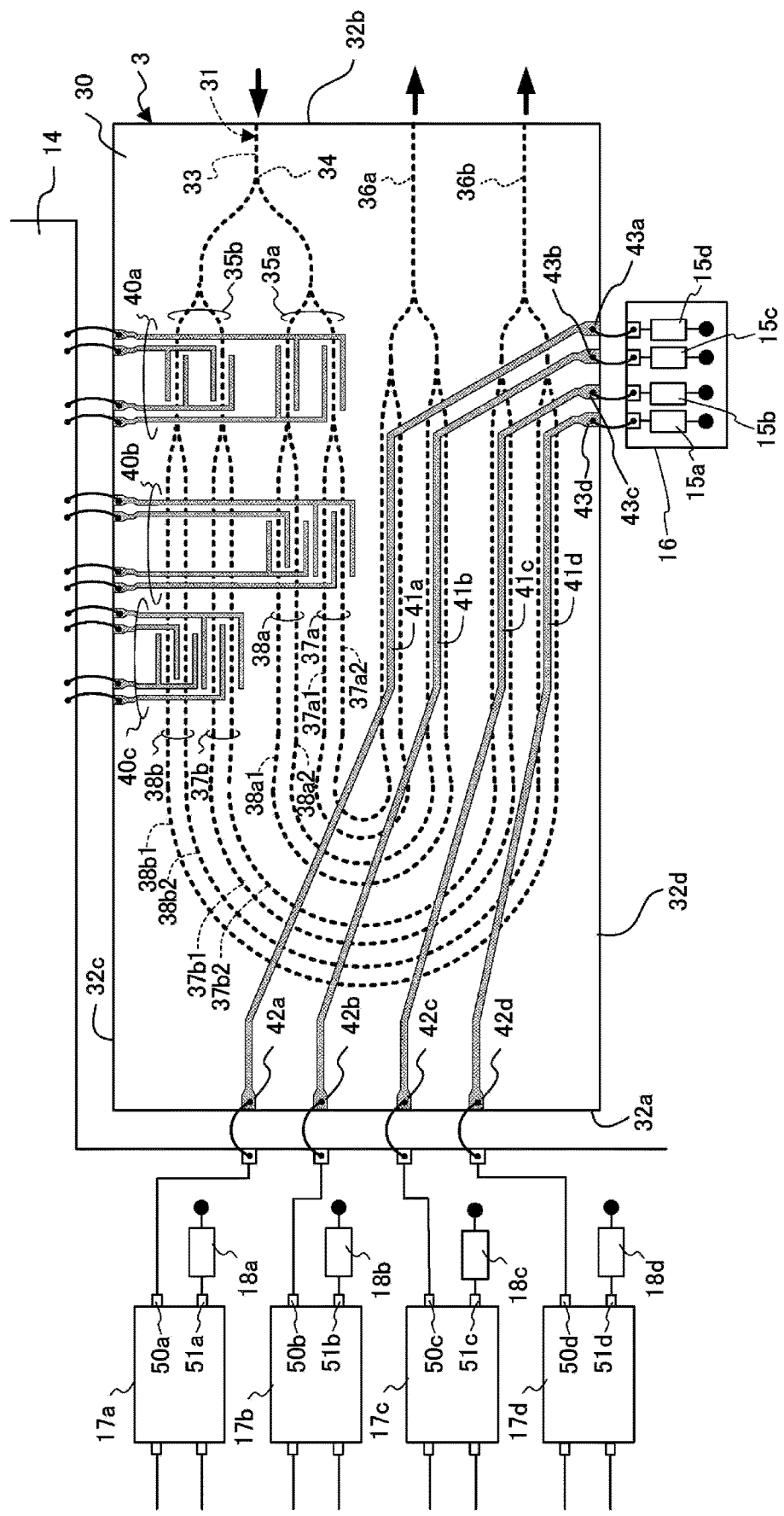
FIG. 2 is a diagram showing the configuration of the optical modulation element used in the optical modulator shown in FIG. 1.

FIG. 2 is a diagram showing an example of the configuration of the optical modulation element 3, which is a DP-QPSK modulator. A part of the relay substrate 14 and the terminator 16 are also shown in FIG. 2.

The optical modulation element 3 is configured by an optical waveguide 31 (the whole of the thick dotted line in the figure) formed on a substrate 30, and performs 200G DP-QPSK modulation, for example. The substrate 30 is, for example, an X-cut LN substrate having an electro-optical effect, which is processed and thinned to a thickness of 20 μm or less (for example, 2 μm). Further, the optical waveguide 31 is a convex optical waveguide (for example, a rib-type optical waveguide or a ridge-type optical waveguide) formed on the surface of the thinned substrate 30 and configured by a convex part extending in a strip shape. Here, since the refractive index of the LN substrate may change locally due to the photoelastic effect when stress is applied, the LN substrate is generally adhered to a support plate such as a Si (silicon) substrate, a glass substrate, or LN in order to reinforce the mechanical strength of the entire substrate.

The substrate 30 is rectangular, for example, and has left and right sides 32a and 32b extending in the up-down direction of the figure and facing each other, and has upper and lower sides 32c and 32d extending in the left-right direction of the figure and facing each other.

The optical waveguide 31 includes an input waveguide 33 that receives input light from the input optical fiber 6 (arrow pointing to the right in the figure) on the upper side of the right side 32b of the substrate 30 in the figure, and includes a branching waveguide 34 that branches the input light into two lights having the same amount of light. The optical waveguide 31 further includes so-called nested Mach-Zehnder optical waveguides 35a and 35b, which are two modulation parts that modulate the respective lights branched by the branching waveguide 34.

In the nested Mach-Zehnder optical waveguides 35a and 35b, the light propagation direction is folded 180 degrees at the left part of the substrate 30 in the figure, and output waveguides 36a and 36b output the light from the side 32b of the substrate 30 to the right in the figure.

The nested Mach-Zehnder optical waveguides 35a and 35b include two Mach-Zehnder optical waveguides 37a, 38a and 37b, 38b provided in two waveguide parts forming a pair of parallel waveguides, respectively.

The Mach-Zehnder optical waveguide 37a includes two parallel waveguides 37a1 and 37a2, and the Mach-Zehnder optical waveguide 38a includes two parallel waveguides 38a1 and 38a2. Further, the Mach-Zehnder optical waveguide 37b includes two parallel waveguides 37b1 and 37b2, and the Mach-Zehnder optical waveguide 38b includes two parallel waveguides 38b1 and 38b2.

In the upper part of the figure of the nested Mach-Zehnder optical waveguides 35a and 35b folded back at the left part of the figure on the substrate 30, bias electrodes 40a, 40b, and 40c are provided for compensating for bias point variations due to so-called DC drift and adjusting the operating point of the Mach-Zehnder optical waveguides 35a and 35b and the four Mach-Zehnder optical waveguides 37a, 38a, 37b, and 38b respectively. The bias electrodes 40a, 40b, and 40c are connected to the signal pin 5 of the housing 2 via wire bonding and conductor patterns (not shown) of the relay substrate 14.

Further, signal electrodes 41a, 41b, 41c and 41d are provided for modulating a total of four Mach-Zehnder optical waveguides 37a, 38a, 37b and 38b configuring the nested Mach-Zehnder optical waveguides 35a and 35b, respectively on the lower part in the figure of the substrate 30. The signal electrodes 41a, 41b, 41c, and 41d are also collectively referred to as the signal electrode 41.

Left sides of the signal electrodes 41a, 41b, 41c and 41d in the figure extend to the left side 32a of the substrate 30 in the figure and are connected to pads 42a, 42b, 42c and 42d, respectively. Further, the right sides of the signal electrodes 41a, 41b, 41c, and 41d in the figure are bent downward in the figure, extend to the side 32d of the substrate 30, and are connected to pads 43a, 43b, 43c, and 43d.

The signal electrodes 41a, 41b, 41c, and 41d, together with a ground conductor pattern (not shown) formed on the substrate 30, form a coplanar transmission line having a predetermined impedance Zm, for example, according to the conventional technology. The ground conductor pattern is provided, for example, so as not to be formed on the optical waveguide 31, and the multiple regions formed by dividing the ground conductor pattern by the optical waveguide 31 may be connected to each other by wire bonding or the like.

The pads 42a, 42b, 42c, and 42d on the left side in the figure of the signal electrodes 41a, 41b, 41c, and 41d are connected to the output terminals 50a, 50b, 50c and 50d of one high-frequency signal configuring the differential signal of each of the drive circuit elements 17a, 17b, 17c and 17d through the wires bonded to these pads and the conductor pattern on the relay substrate 14. The pads 43a, 43b, 43c, and 43d on the lower right in the figure of the signal electrodes 41a, 41b, 41c, and 41d are connected to one ends of the terminating resistors 15a, 15b, 15c, and 15d in the terminator 16 via bonding wires. The other ends of the terminating resistors 15a, 15b, 15c, and 15d are connected to, for example, ground lines (not shown) provided on a substrate forming the terminator 16, respectively.

In addition, the output terminals 51a, 51b, 51c, and 51d of the other high-frequency signals configuring the differential signals of the drive circuit elements 17a, 17b, 17c, and 17d are respectively connected to ends of terminating resistors 18a, 18b, 18c, and 18d mounted on the relay substrate 14 via the conductor pattern on the relay substrate 14. The other ends of the terminating resistors 18a, 18b, 18c, and 18d are connected to a ground pattern (not shown) provided on the relay substrate 14.

Hereinafter, the output terminals 50a, 50b, 50c, and 50d of the drive circuit elements 17a, 17b, 17c, and 17d are also collectively referred to as the output terminal 50, and the output terminals 51a, 51b, 51c, and 51d are also collectively referred to as the output terminal 51.

Here, in the drive circuit element 17, for example, the line impedances, which are the output impedances measured between the output terminals 50 and 51 of the two high-frequency signals configuring the differential signal and the ground potential, have values Zlin that are equal to each other. This line impedance Zlin is, for example, 50Ω. The differential impedance Zdif, which is the output impedance measured between the differential signal output terminals 50 and 51 of the drive circuit element 17, is 100Ω.

In the optical modulator 1 having the above configuration, high-frequency signals output from one output terminal 50 of the drive circuit element 17 that outputs an amplified differential signal are propagated through the corresponding signal electrode 41 and then terminated by the terminating resistor 15. Further, the high-frequency signals output from the other output terminal 51 of the drive circuit element 17 are terminated by the corresponding terminating resistor 18 mounted on the relay substrate 14. Here, the terminating resistors 15 and 18 respectively correspond to a first terminating resistor and a second terminating resistor in the disclosure.

Figure 3:
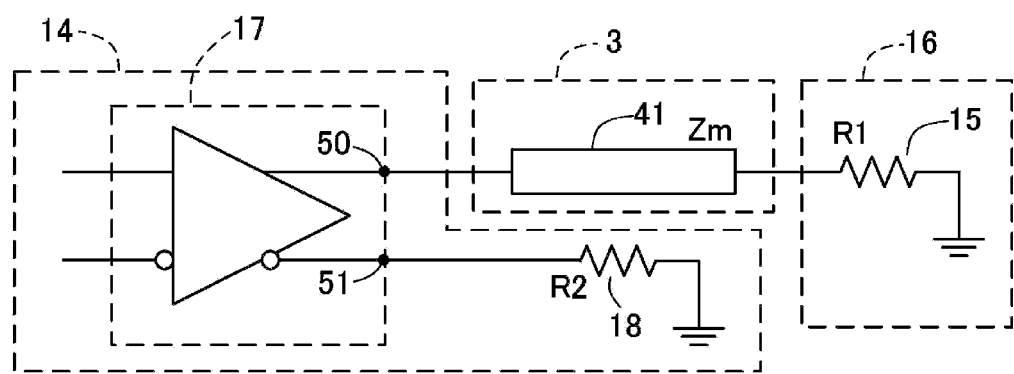
FIG. 3 is a circuit diagram of an electric circuit configured by drive circuit elements, signal electrodes, and terminating resistors.

FIG. 3 shows the drive circuit element 17, the signal electrode 41 as its load, and the terminating resistors 15 and 18 using circuit symbols. In FIG. 3, the resistance value of the terminating resistor 15, which is the first terminating resistor, is R1; the resistance value of the terminating resistor 18, which is the second terminating resistor, is R2; and the impedance of the signal electrode 41 at the signal frequency of the high-frequency signal output by the drive circuit element 17 is Zm. FIG. 3 also shows the output equivalent circuit of the drive circuit element 17 using the line impedance Zlin. The output differential impedance Zdif of the drive circuit element 17 measured between the output terminals 50 and 51 is 2×Zlin.

In this embodiment, in particular, the optical modulator 1 is configured such that the resistance value R2 of the terminating resistor 18, which is the second terminating resistor, is set to a value greater than the resistance value R1 of the terminating resistor 15, which is the first terminating resistor. That is, R1 and R2 have the following relationship.

$$R2 > R1 \tag{1}$$

Conventionally, in a two-input two-output high-frequency amplifier circuit such as the drive circuit element 17, the two outputs are terminated by loads having substantially the same impedance as the output impedance of the high-frequency amplifier circuit and are used to output substantially the same power.

In contrast, in this embodiment, the resistance values R1 and R2 of the terminating resistors 15 and 18 respectively connected to the two high-frequency signal outputs of the drive circuit element 17 have different values.

In general, electric energy such as current and high frequency tends to pass through a part with low resistance, and it is difficult to pass through a part with high resistance. Therefore, by making the resistance values of the terminating resistors respectively connected to the two outputs of the two-output type amplifier circuit such as the drive circuit element 17 different from each other (that is, by making them asymmetrical), the output power of the two outputs of the amplifier circuit may be asymmetrical.

In this embodiment, as described above, one of the two high-frequency signal outputs of the drive circuit element 17 propagates through the signal electrode 41 of the optical modulation element 3 and is terminated by the terminating resistor 15 having the resistance value R1, and the other high-frequency signal output is terminated by the terminating resistor 18 having the resistance value R2 greater than R1. In this way, of the two high-frequency signal outputs of the drive circuit element 17, by reducing the output power of one high-frequency signal output propagating through the signal electrode 41, the output power of the other high-frequency signal output may be reduced, so that the power consumption of the drive circuit element 17 may be reduced. In addition, it is possible to reduce power consumption by reducing the power supplied to the drive circuit element 17 by the amount corresponding to the increase in the output power of the high-frequency signal propagating through the signal electrode 41. Moreover, this reduction in power consumption may be achieved in a very simple way by changing the resistance values R1 and R2 of the terminating resistors 15 and 18 connected to the differential signal output of the drive circuit element 17, so no major design change is required.

As a result, in the optical modulator 1 of this embodiment, the power consumption of the optical modulator 1 as a whole may be easily reduced compared with the conventional configuration in which the two high-frequency signal outputs of the drive circuit element 17 are terminated with the same resistance value.

For the same reason, when the drive circuit element 17 is driven with the same power consumption as the conventional configuration, since the power of one high-frequency signal output to the signal electrode 41 may be made larger than the power of the other high-frequency signal, the length of the signal electrode 41 may be shortened, which facilitates broadening the band of the modulation operation of the optical modulator 1 and reducing the size.

Furthermore, in the configuration described in Patent Literature 1, in which both high-frequency signals of the differential signal output from the drive circuit element are used for the modulation operation, it is necessary to match the line impedance of each high-frequency signal output and the terminating resistor (that is, to ensure the symmetry of the resistance values of the two terminating resistors) and to match the differential impedance of the two high-frequency signal outputs with the synthesized resistance value of the terminating resistors, and the optical modulation operation of the optical modulation element may become unstable when the matching is incomplete.

In contrast, in the optical modulator 1 of this embodiment, only one of the two high-frequency signals that configure the differential signal is used for modulation operation. Compared with the above conventional configuration, even if there is an impedance mismatch between the line impedance and the terminating resistor, or even if the symmetry of the resistance values of the two terminating resistors is broken, instability in the above optical modulation operation and amplification operation is less likely to occur.

Some drive circuit elements for amplifying differential signals may include an equivalent circuit that equalizes the output power of two high-frequency signals that configure the differential signal output (that is, controls these output powers to be equal to each other). However, in the configuration of this embodiment, between the differential signal outputs of the drive circuit element 17, the resistance values of the terminating resistors connected to those outputs are made asymmetrical to make the magnitude of the output power asymmetrical; therefore, it is desirable that the drive circuit element 17 does not include an equivalent circuit for output power as described above.

Several aspects of the relationship between the resistance values R1 and R2 of the terminating resistors 15 and 18 connected to the drive circuit element 17 in the optical modulator 1 of this embodiment will be described below. In the optical modulator 1, any aspect shown below may be commonly applied to the four drive circuit elements 17, or different aspects may be applied.

1.1 First Aspect

As a first aspect of this embodiment, the resistance value R2 of the terminating resistor 18 is set to the same value as the line impedance Zlin of the drive circuit element 17 so as to suppress the reflection of the high-frequency signal at the terminating resistor 18, and the resistance value R1 of the terminating resistor 15 is set to be less than the resistance value R2 of the terminating resistor 18. That is, R1, R2, and Zlin are set to have the following relationship.

$$R2 = Zlin > R1 \quad (2)$$

Specifically, for example, the line impedance Zlin of the drive circuit element 17, the impedance Zm of the signal electrode 41, and the resistance value R2 of the terminating resistor 18 are set to 50Ω, and the resistance value R1 of the terminating resistor 15 is set to 40Ω.

In equation (2) representing the first aspect described above, if the resistance value R1 of the terminating resistor 15, which is the first terminating resistor, is made smaller, the signal power of the high-frequency signal output from the drive circuit element 17 to the signal electrode 41 increases accordingly. Therefore, from the viewpoint of increasing the signal power output to the signal electrode 41, for example, when the line impedance of the drive circuit element 17 is 50Ω, the resistance value R1 of the terminating resistor 15 is desirably less than 50Ω, for example, 45Ω or less, and more effectively if it is 40Ω or less.

However, if the resistance value R1 of the terminating resistor 15 is set to be much lower than the line impedance Zlin of the drive circuit element 17, the reflection of the high-frequency signal at the terminating resistor 15 may be increased due to the impedance mismatch. In this case, the high-frequency signal reflected at the terminating resistor 15 (hereinafter referred to as a reflected high-frequency signal) reaches the output terminal 50 of the drive circuit element 17, which may make the operation of the drive circuit element 17 unstable. Therefore, from the viewpoint of suppressing the reflection of high-frequency signals at the terminating resistor 15 and ensuring the stability of the operation of the drive circuit element 17, it is desirable that the line impedance Zlin of the drive circuit element 17 and the resistance value R1 of the terminating resistor 15 have the following relationship.

$$0.4 Zlin < R1 < Zlin \quad (3)$$

1.2 Second Aspect

As a second aspect of the resistance values R1 and R2 of the terminating resistors 15 and 18 in the optical modulator 1 of this embodiment, the resistance value R1 of the terminating resistor 15 is set to the same value as the line impedance Zlin of the drive circuit element 17 so as to suppress the reflection of the high-frequency signal at the terminating resistor 15, and the resistance value R2 of the terminating resistor 18 is set to be greater than the resistance value R1 of the terminating resistor 15. That is, R1, R2, and Zlin are set to have the following relationship.

$$R2 > R1 = Zlin \quad (4)$$

Specifically, for example, the line impedance Zlin of the drive circuit element 17, the impedance Zm of the signal electrode 41, and the resistance value R1 of the terminating resistor 15 may be set to 50Ω, and the resistance value R2 of the terminating resistor 18 may be set to 60Ω.

According to the aspect represented by equation (4), since the resistance value R1 of the terminating resistor 15 matches the line impedance Zlin of the drive circuit element 17, generation of the reflected high-frequency signal in the terminating resistor 15 is suppressed, and therefore instability of the optical modulation operation of the optical modulation element 3 due to the reflected high-frequency signal is suppressed. That is, this aspect is suitable for the case where it is desired to reduce the power consumption of the optical modulator 1 while suppressing the adverse effect of the impedance mismatch on the optical modulation operation.

1.3 Third Aspect

As a third aspect of the resistance values R1 and R2 of the terminating resistors 15 and 18 in the optical modulator 1 of this embodiment, the resistance values R1 and R2 of the terminating resistors 15 and 18 are set such that the resistance value R2 is greater than the line impedance Zlin of the drive circuit element 17 and the resistance value R1 is less than the line impedance Zlin of the drive circuit element 17 in the range where their sum is the same value as the differential impedance Zdif of the drive circuit element 17. That is, R1, R2, Zlin and Zdif are set to have the following relationship.

$$R1 + R2 = Zdif, \text{ and}$$

$$R2 > Zlin > R1 \quad (5)$$

Specifically, for example, the differential impedance Zdif and the line impedance Zlin of the drive circuit element 17 are 100Ω and 50Ω, respectively; the impedance Zm of the signal electrode 41 is 50Ω; the resistance value R1 of the terminating resistor 15 is 40Ω; and the resistance value R2 of the terminating resistor 18 is 602.

According to the aspect represented by equation (5), it is possible to suppress destabilization of the drive circuit operation by ensuring the matching state between the synthesized resistance value of the terminating resistors 15 and 18 and the differential impedance of the drive circuit element 17; therefore, the difference between the resistance values R1 and R2 may be set larger. Therefore, in this aspect, the signal power of the high-frequency signal output from the drive circuit element 17 to the terminating resistor 18 may be further reduced with respect to the signal power of the high-frequency signal output from the drive circuit element 17 to the signal electrode 41.

1.4 Fourth Aspect

As a fourth aspect of the resistance values R1 and R2 of the terminating resistors 15 and 18 in the optical modulator 1 of this embodiment, both the resistance values R1 and R2 of the terminating resistors 15 and 18 are both set to be less than the line impedance Zlin of the drive circuit element 17 and to satisfy equation (1) above. That is, R1, R2 and Zlin are set to have the following relationship.

$$Zlin > R2 > R1 \quad (6)$$

Specifically, for example, the line impedance Zlin of the drive circuit element 17 and the impedance Zm of the signal electrode 41 are 50Ω; the resistance value R1 of the terminating resistor 15 is 30Ω; and the resistance value R2 of the terminating resistor 18 is 40Ω.

In the aspect represented by equation (6) as well, the resistance value R2 of the terminating resistor 18 is set to a value greater than the resistance value R1 of the terminating resistor 15; therefore, compared with the signal power of the high-frequency signal output from the drive circuit element 17 to the signal electrode 41, the signal power of the high-frequency signal output from the drive circuit element 17 to the terminating resistor 18 may be reduced. However, in this embodiment, since the resistance values R1 and R2 of the terminating resistors 15 and 18 are both different from the line impedance of the drive circuit element 17, the reflected high-frequency signal generated by the reflection of the high-frequency signal at the terminating resistors 15 and 18 may be larger than other aspects. Therefore, this aspect may be applied when the drive circuit element 17 is resistant to reflected high-frequency signals incident from the output terminals 50 and 51.

In addition, though the line impedance Zlin is set to 50Ω in this embodiment, it is not limited to this value, and may be other values such as 40Ω.

2. Modified Example of First Embodiment

Next, a modified example of the optical modulator 1 according to this embodiment will be described.

In a two-input two-output type amplifier circuit such as the drive circuit element 17 that amplifies and outputs a differential signal, if the phases and intensities of the two reflected high-frequency signals incident on the two output terminals are the same, interference between the reflected high-frequency signals may significantly affect the circuit operation.

For this reason, in general, when using an amplifier circuit that outputs a differential signal, both the resistance value of the terminating resistor for each of the two high-frequency signal outputs that configure the differential signal output and the electrical lengths of the two transmission lines leading to those terminating resistors are designed to be the same as each other.

However, when the two transmission lines have substantially the same electrical length as in the conventional configuration, and the two terminating resistors have different resistance values as in this embodiment, the reflected high-frequency signals generated at the two terminating resistors may propagate back through the two transmission lines over the same electrical length, interfere with each other inside the amplifier circuit, and adversely affect the amplification operation.

Figure 4:
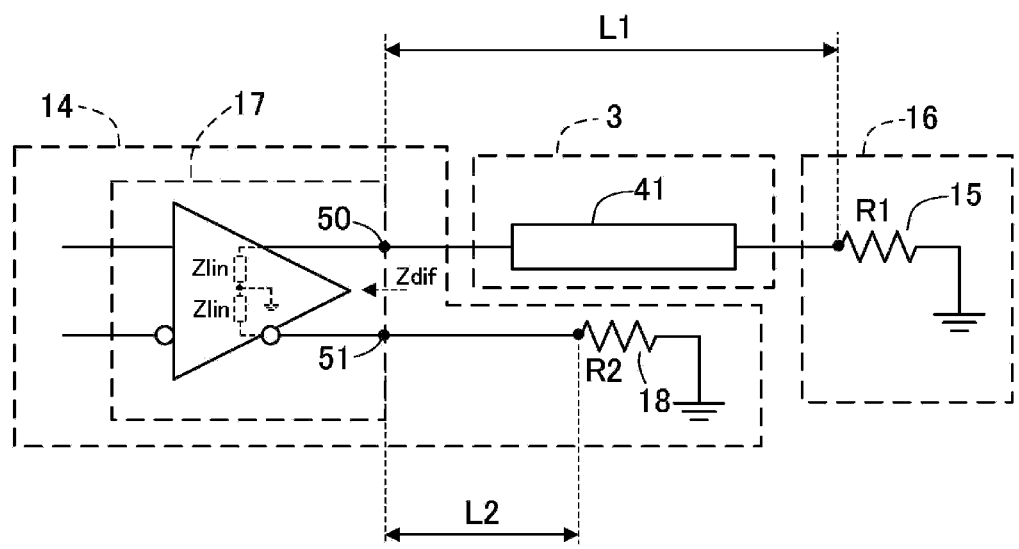
FIG. 4 is a diagram for illustrating a modified example of the first embodiment.

In order to avoid this, in this modified example, as shown in FIG. 4, an electrical length L1 of the high-frequency transmission line including the signal electrode 41 from the output terminal 50 of the drive circuit element 17 to the terminating resistor 15 and the electrical length L2 of the high-frequency transmission line on the relay substrate 14 from the output terminal 51 to the terminating resistor 18 are made different from each other. This configuration may be applied to any of the first to fourth aspects of the resistance values R1 and R2 described above.

In this way, the reflected high-frequency signals that may occur at the terminating resistors 15 and 18 have different phases and different intensities when reaching the drive circuit element 17; therefore, by suppressing the interference of these reflected high-frequency signals in the drive circuit element 17, it is possible to effectively suppress the adverse effects of the reflected high-frequency signals (that is, returned electrical signals) on the circuit operation.

Further, in the configuration of the optical modulator 1, since the electrical length L1 includes the electrical length of the signal electrode 41 of the optical modulation element 3, the electrical lengths L1 and L2 are preferably set so as to satisfy the relationship of L1>L2.

From the viewpoint of further suppressing interference of reflected high-frequency signals, it is more preferable that the electrical lengths L1 and L2 have the following relationship.

$$(L1 - L2) > \lambda/2 \quad (7)$$

Here, λ is the wavelength in the high-frequency transmission line of the differential signal (high-frequency signal) output by the drive circuit element 17.

As an example, when the average frequency of the differential high-frequency signal is 20 GHz, the wavelength of microwaves in vacuum is about 15 mm; therefore, assuming that the effective refractive index of each high-frequency transmission line is 2, λ/2 is 3.75 mm. Therefore, in this case, it is preferable to design the high-frequency transmission line to the terminating resistors 15 and 18 so that the electrical length difference (L1−L2) is longer than 3.75 mm.

3. Second Embodiment

Figure 5:
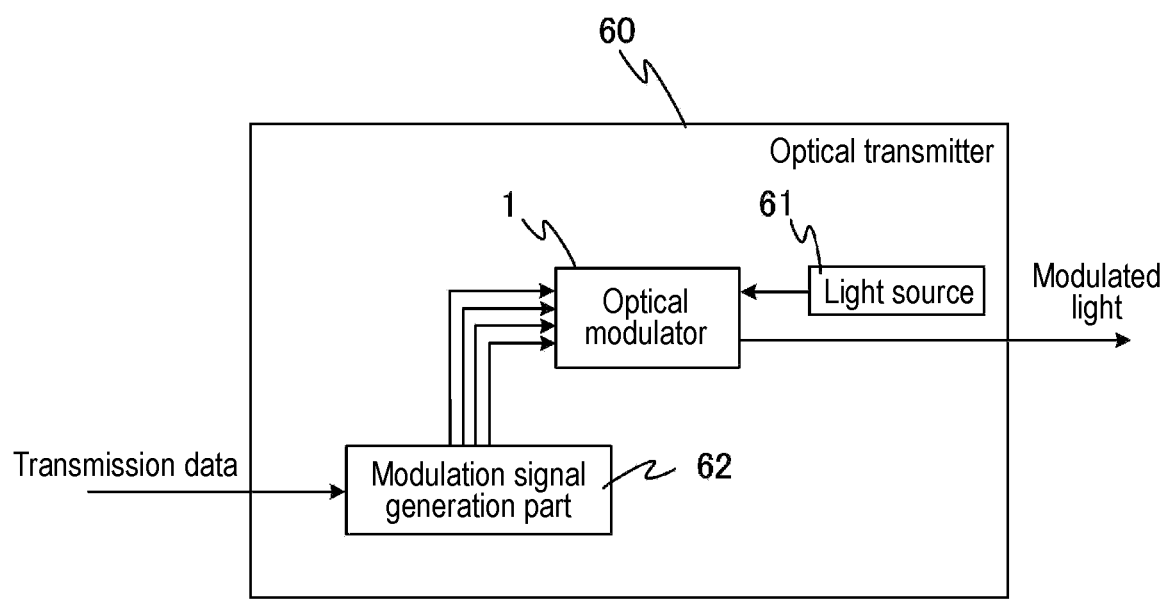
FIG. 5 is a diagram showing the configuration of an optical transmitter according to the second embodiment of the disclosure.

Next, a second embodiment of the disclosure will be described. This embodiment is an optical transmitter 60 equipped with the optical modulator 1 according to the first embodiment. FIG. 5 is a diagram showing the configuration of the optical transmitter 60 according to this embodiment. This optical transmitter 60 includes the optical modulator 1, a light source 61, and a modulation signal generation part 62. The modulation signal generation part 62 is an electronic circuit that generates a high-frequency signal (modulation signal) for causing the optical modulator 1 to perform a modulation operation. The modulation signal generation part 62 inputs four modulation signals corresponding to the four signal electrodes 41 of the optical modulation element 3 provided in the optical modulator 1 into the optical modulator 1 in the form of differential signals based on, for example, externally supplied transmission data. In this way, the optical modulator 1 modulates the light from the light source 61 incident from the input optical fiber 6 and outputs the modulated light through the output optical fiber 7.

Since the optical transmitter 60 having the configuration described above uses the optical modulator 1 described above, it is possible to reduce the power consumption or reduce the size of the entire apparatus while constructing the apparatus at a low cost.

4. Other Embodiments

It should be noted that the disclosure is not limited to the configurations of the above-described embodiments and their alternative configurations, and may be implemented in various forms without departing from the spirit of the disclosure.

Figure 6:
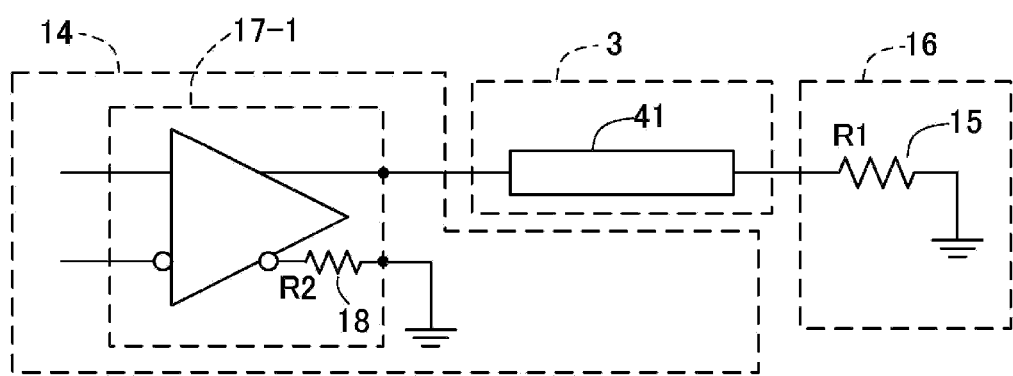
FIG. 6 is a diagram showing an example of providing a terminating resistor within a drive circuit element.

For example, the terminating resistor 18 that terminates the high-frequency signal that is not used for driving the optical modulation element 3 among the differential signals output by the drive circuit element 17 is mounted on the relay substrate 14 in the above-described embodiment. However, like the drive circuit element 17-1 shown in FIG. 6, it may be provided inside the element.

Further, in the above-described embodiment, the drive circuit element 17 outputs a differential signal configured by two high-frequency signals whose phases are opposite with respect to each other; however, it may output multiple high-frequency signals having the same phase. Even in this case, when the optical modulation element 3 is driven using a part of such multiple high-frequency signals, as in the above-described embodiment, the resistance value of the terminating resistor for the high-frequency signal not used for driving the optical modulation element 3 is made larger than the resistance value of the terminating resistor for the high-frequency signal used for driving the optical modulation element 3; therefore, the power consumed as the high-frequency signal not used for driving the optical modulation element 3 may be reduced. In this way, the power consumption of the drive circuit element 17 may be reduced, or the power of the signal used for driving may be increased to shorten the length of the signal electrode 41; therefore, the power consumption of the optical modulator 1 may be reduced, or its size may be reduced.

5. Configuration Supported by the Above Embodiments

The above embodiments and modified examples support the following configurations.

(Configuration 1) An optical modulator includes: an optical waveguide element including an optical waveguide formed on a substrate and a signal electrode for controlling a light wave propagating through the optical waveguide; a drive circuit for outputting two high-frequency signals; and two terminating resistors for respectively terminating outputs of the two high-frequency signals from the drive circuit. The output of one of the high-frequency signals of the drive circuit propagates through the signal electrode of the optical waveguide element and is terminated by a first terminating resistor which is one of the terminating resistors. The output of the other of the high-frequency signals of the drive circuit is terminated by a second terminating resistor which is the other of the terminating resistors. A resistance value of the second terminating resistor is greater than a resistance value of the first terminating resistor.

According to the optical modulator of Configuration 1, when the optical modulator is driven using a part of the signal output of the drive circuit having multiple signal outputs such as differential signals, it is possible to reduce the power consumption of the signal output that is not used for driving the optical modulator. Therefore, the optical modulator may be configured at low cost by using a drive circuit such as a differential signal amplifier that may be procured at low cost in the market, and its power consumption may be reduced or its size may be reduced.

(Configuration 2) In the optical modulator according to Configuration 1, the two high-frequency signals output by the drive circuit are a pair of differential signals whose phases are opposite to each other.

According to the optical modulator of Configuration 2, for example, a low-cost and highly reliable differential signal amplifier element that has already been commercialized may be used to configure the optical modulator without causing an increase in power consumption.

(Configuration 3) In the optical modulator according to Configuration 2, a sum of the resistance value of the first terminating resistor and the resistance value of the second terminating resistor is equal to a differential impedance of the outputs of the two high-frequency signals that configure the differential signals of the drive circuit.

According to the optical modulator of Configuration 3, since the differential impedance of the output of the drive circuit and the synthesized resistance value of the first terminating resistor and the second terminating resistor are configured to match, it is possible to suppress the adverse effect of reflected high-frequency signals that may occur at the first terminating resistor and the second terminating resistor on the stability of the drive circuit operation.

(Configuration 4) In the optical modulator according to any one of Configurations 1 to 3, the resistance value R1 of the first terminating resistor that terminates the output of the one of the high-frequency signals driving the signal electrode is in a range of $0.4 \times Zlin < R1 \leq Zlin$ with respect to a value Zlin of an output impedance between the output of the one of the high-frequency signals and a ground potential in the drive circuit.

According to the optical modulator of Configuration 4, it is possible to suppress the reflection of high-frequency signals at the first terminating resistor and avoid unstable operation of the drive circuit.

(Configuration 5) In the optical modulator according to Configuration 4, the value Zlin of the output impedance is 50Ω, and the resistance value R1 of the first terminating resistor is 45Ω or less.

According to the optical modulator of Configuration 5, it is possible to suppress the reflection of high-frequency signals at the first terminating resistor and maintain the stability of the operation of the drive circuit.

(Configuration 6) In the optical modulator according to any one of Configurations 1 to 5, the substrate of the optical waveguide element is an X-cut $LiNbO_3$ substrate.

According to the optical modulator of Configuration 6, in the optical modulator using the LN substrate, even when the optical modulation element is driven using a part of the signal output of the drive circuit having signal outputs of multiple high-frequency signals such as differential signals, the power consumption of the optical modulation element may be reduced or the size thereof may be reduced.

(Configuration 7) In the optical modulator according to any one of Configurations 1 to 6, an electrical length L1 of a high-frequency transmission line from the output of the drive circuit to the first terminating resistor for the one of the high-frequency signals is different from an electrical length L2 of a high-frequency transmission line from the output of the drive circuit to the second terminating resistor for the other of the high-frequency signals.

According to the optical modulator of Configuration 7, it is possible to further prevent the operation of the drive circuit from becoming unstable due to mutual interference of two reflected high-frequency signals that may occur at the first terminating resistor and the second terminating resistor.

(Configuration 8) In the optical modulator according to Configuration 7, the electrical lengths L1 and L2 have a relationship of $(L1-L2) > \lambda/2$ with respect to an average wavelength $\lambda$ of the two high-frequency signals in the high-frequency transmission line.

According to the optical modulator of Configuration 8, it is possible to more effectively prevent the operation of the drive circuit from becoming unstable due to mutual interference of two reflected high-frequency signals that may occur at the first terminating resistor and the second terminating resistor.

(Configuration 9) An optical transmitter includes: the optical modulator according to any one of Configurations 1 to 8; and an electronic circuit that generates a modulation signal which is a high-frequency signal for causing the optical waveguide element to perform a modulation operation.

According to the optical transmitter of Configuration 9, since the optical modulator according to any one of Configurations 1 to 8 is used, the optical transmitter may be configured at low cost while reducing its power consumption or reducing its size.

What is claimed is:

1. An optical modulator comprising:
   an optical waveguide element comprising an optical waveguide formed on a substrate and a signal electrode for controlling a light wave propagating through the optical waveguide;
   a drive circuit for outputting two high-frequency signals; and
   two terminating resistors for respectively terminating outputs of the two high-frequency signals from the drive circuit;
   wherein the output of one of the high-frequency signals of the drive circuit propagates through the signal electrode of the optical waveguide element and is terminated by a first terminating resistor which is one of the terminating resistors,
   the output of the other of the high-frequency signals of the drive circuit is terminated by a second terminating resistor which is the other of the terminating resistors, and
   a resistance value of the second terminating resistor is greater than a resistance value of the first terminating resistor,
   wherein the resistance value R1 of the first terminating resistor that terminates the output of the one of the high-frequency signals driving the signal electrode is in a range of:

$0.4 \times Zlin < R1 \leq Zlin$ with respect to a value Zlin of an output impedance between the output of the one of the high-frequency signals and a ground potential in the drive circuit.

2. The optical modulator according to claim 1, wherein the two high-frequency signals output by the drive circuit are a pair of differential signals whose phases are opposite to each other.

3. The optical modulator according to claim 2, wherein a sum of the resistance value of the first terminating resistor and the resistance value of the second terminating resistor is equal to a differential impedance of the outputs of the two high-frequency signals that configure the differential signals of the drive circuit.

4. The optical modulator according to claim 1, wherein the value Zlin of the output impedance is 50Ω, and the resistance value R1 of the first terminating resistor is 45Ω or less.

5. The optical modulator according to claim 1, wherein the substrate of the optical waveguide element is an X-cut $LiNbO_3$ substrate.

6. The optical modulator according to claim 1, wherein an electrical length L1 of a high-frequency transmission line from the output of the drive circuit to the first terminating resistor for the one of the high-frequency signals is different from an electrical length L2 of a high-frequency transmission line from the output of the drive circuit to the second terminating resistor for the other of the high-frequency signals.

7. The optical modulator according to claim 6, wherein the electrical lengths L1 and L2 have a relationship of:

$(L1-L2) > \lambda/2$ with respect to an average wavelength λ of the two high-frequency signals in the high-frequency transmission line.

8. An optical transmitter comprising:
   the optical modulator according to claim 1; and
   an electronic circuit that generates a modulation signal which is a high-frequency signal for causing the optical waveguide element to perform a modulation operation.

* * * * *